United States Patent
Hung et al.

(10) Patent No.: US 9,165,030 B1
(45) Date of Patent: Oct. 20, 2015

(54) SHOWING PROMINENT USERS FOR INFORMATION RETRIEVAL REQUESTS

(71) Applicant: Google Inc., Mountain View, CA (US)

(72) Inventors: Wanda Wen-hui Hung, Los Gatos, CA (US); Jun Gong, San Jose, CA (US); Bogdan Dorohonceanu, Somerset, NJ (US); Sagar Kamdar, Redwood City, CA (US); Othar Hansson, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/723,787

(22) Filed: Dec. 21, 2012

Related U.S. Application Data

(60) Provisional application No. 61/584,693, filed on Jan. 9, 2012.

(51) Int. Cl.
*G06F 17/30* (2006.01)
(52) U.S. Cl.
CPC .............................. *G06F 17/30424* (2013.01)
(58) Field of Classification Search
CPC ................................................. G06F 17/30867
USPC .......... 707/607, 706, 713, 722, 736, 758, 813
See application file for complete search history.

(56) References Cited

U.S. PATENT DOCUMENTS

| | | |
|---|---|---|
| 6,891,939 B1 | 5/2005 | Urban et al. |
| 7,580,938 B1 | 8/2009 | Pai et al. |
| 8,484,190 B1 | 7/2013 | Igarashi et al. |
| 8,661,015 B2 | 2/2014 | Karana |
| 8,676,792 B1 | 3/2014 | Scatamacchia et al. |
| 8,688,667 B1 | 4/2014 | Kurzion et al. |
| 2003/0026413 A1 | 2/2003 | Brandt et al. |
| 2007/0036146 A1 | 2/2007 | Adkins et al. |
| 2008/0065237 A1 | 3/2008 | Long |
| 2010/0042619 A1 | 2/2010 | Jones et al. |
| 2010/0070554 A1* | 3/2010 | Richardson et al. .......... 709/202 |
| 2011/0276507 A1* | 11/2011 | O'Malley ...................... 705/321 |
| 2011/0302117 A1* | 12/2011 | Pinckney et al. ............... 706/12 |
| 2011/0320423 A1 | 12/2011 | Gemmell et al. |
| 2011/0320458 A1 | 12/2011 | Karana |
| 2012/0130978 A1 | 5/2012 | Li et al. |
| 2013/0246415 A1 | 9/2013 | Davis et al. |
| 2013/0346396 A1 | 12/2013 | Stamm et al. |
| 2014/0019441 A1 | 1/2014 | Shieh et al. |

\* cited by examiner

*Primary Examiner* — Sana Al Hashemi
(74) *Attorney, Agent, or Firm* — Fish & Richardson P.C.

(57) ABSTRACT

Implementations of the present disclosure include actions of receiving a search query from a searching user, in response to the search query matching a trigger query, receiving a first set of authoritative users, processing the first set of authoritative users to define a second set of authoritative users, and transmitting instructions to display data associated with authoritative users of the second set of authoritative users with search results responsive to the search query.

20 Claims, 3 Drawing Sheets

SHOWING PROMINENT USERS FOR INFORMATION RETRIEVAL REQUESTS

CROSS-REFERENCE TO RELATED APPLICATIONS

This application claims the benefit and priority of U.S. Provisional Application No. 61/584,693, filed Jan. 9, 2012, the disclosure of which is expressly incorporated herein by reference in the entirety.

BACKGROUND

Search engines aim to identify resources (e.g., images, audio, video, web pages, text, documents) that are relevant to a user's needs and to present information about the resources in a manner that is most useful to the user. Search engines return a set of search results in response to a user submitted text query. For example, in response to an image search text query, the search engine returns a set of search results identifying resources responsive to the query.

SUMMARY

The present disclosure relates to searching.

In general, innovative aspects of the subject matter described in this specification can be embodied in methods including the actions of receiving a search query from a searching user, in response to the search query matching a trigger query, receiving a first set of authoritative users, processing the first set of authoritative users to define a second set of authoritative users, and transmitting instructions to display data associated with authoritative users of the second set of authoritative users with search results responsive to the search query. Other implementations of this aspect include corresponding systems, apparatus, and computer programs, configured to perform the actions of the methods, encoded on computer storage devices.

These and other implementations may each optionally include one or more of the following features. For instance, the trigger query is provided in a plurality of trigger queries electronically stored in a database; the trigger query includes a query for which one or more authoritative users are to be displayed in response to a matching query; the second set of authoritative users is a sub-set of the first set of authoritative users; processing the first set of authoritative users to define a second set of authoritative users includes applying one or more rules to the first set of authoritative users; each authoritative user of the first set of authoritative users is associated with a score to provide a plurality of scores, and a rule of the one or more rules includes selecting a sub-set of authoritative users from the first set of authoritative users based on the plurality of scores, the second set of authoritative users being at least partially populated with the sub-set of authoritative users; a rule of the one or more rules includes randomly selecting a sub-set of authoritative users from the first set of authoritative users, the second set of authoritative users being at least partially populated with the sub-set of authoritative users; and each authoritative user includes a user of one or more computer-implemented services that has been determined to be authoritative on one or more topics that can be associated with one or more queries.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Implementations of the present disclosure are generally directed to including authoritative users in search results. More particularly, implementations of the present disclosure are directed to displaying one or more users of one or more social networking services as authoritative users in response to a search query submitted by a searching user. In some examples, and as discussed in further detail herein, a first set of authoritative users is provided in response to the search query, and a second set of authoritative users is defined based on the first set of authoritative users. Data associated with the authoritative users of the second set of authoritative users is provided for display with search results that are responsive to the search query. In some examples, an authoritative user is a user of one or more computer-implemented services (e.g., a social networking service) that has been determined to be authoritative (e.g., an expert) on one or more topics that can be associated with one or more queries.

Figure 1:
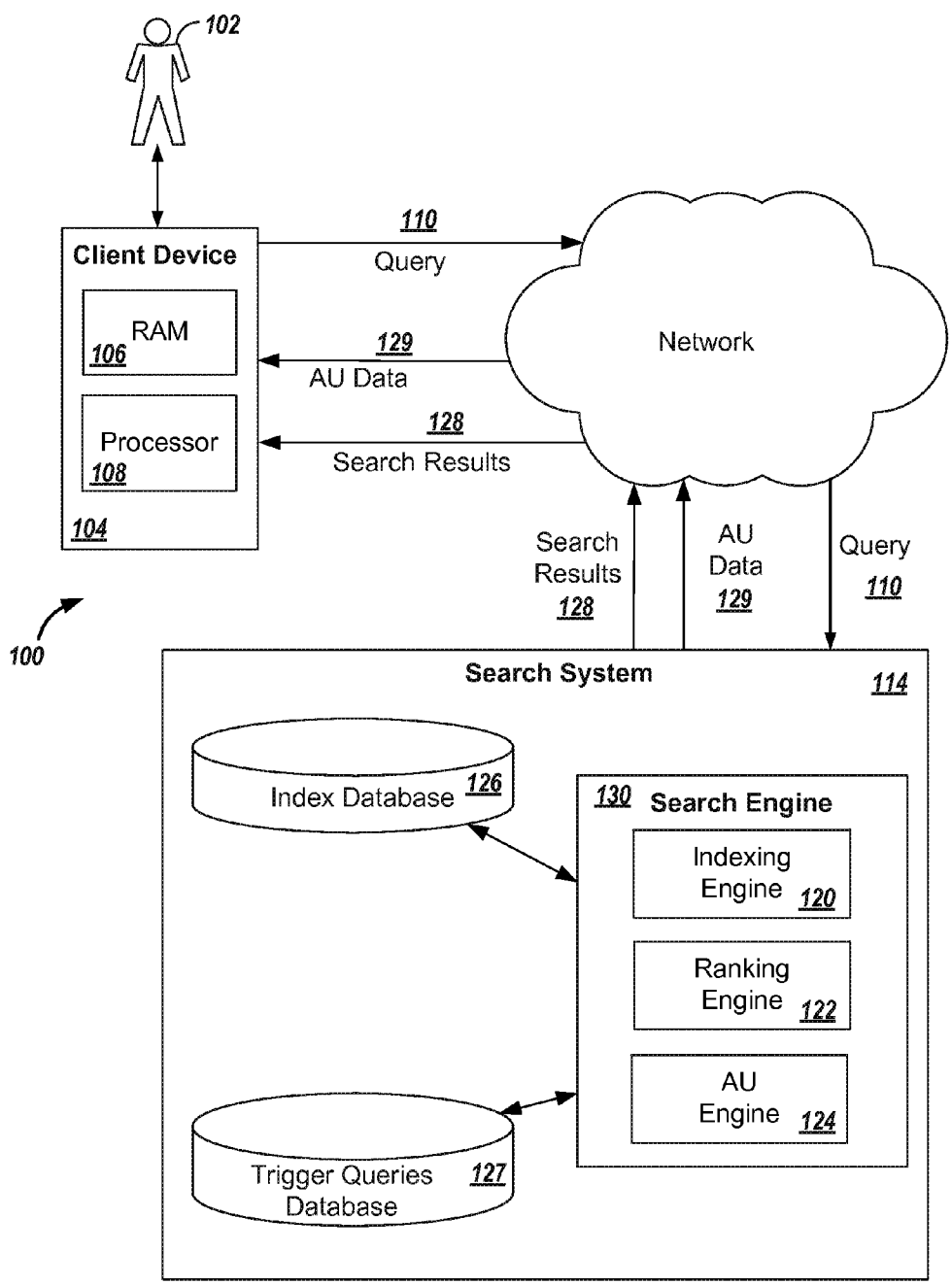
FIG. 1 depicts an example information retrieval system.

FIG. 1 depicts an example information retrieval system 100. The system 100 provides search results relevant to submitted queries as can be implemented in the Internet, an intranet, or another client and server environment. In accordance with the present disclosure, the system 100 also provides authoritative users relevant to the submitted queries. The system 100 is an example of an information retrieval system in which the systems, components, and techniques described below can be implemented.

A user 102 can interact with a search system 114 through a client device 104. For example, the client device 104 can be a computing device coupled to the search system 114 through a local area network (LAN) or wide area network (WAN), e.g., the Internet. In some implementations, the search system 114 and the client device 104 can be one machine. For example, a user can install a desktop search application on the client device 104. The client device 104 will generally include a random access memory (RAM) 106 and a processor 108.

The client device 104 can include any type of computing device such as a desktop computer, a tablet computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any two or more of these data processing devices or other data processing devices. The search system 114 can include one or more server systems.

A user 102 can submit a query 110 to the search system 114. When the user 102 submits a query 110, the query 110 is transmitted through a network to the search system 114. The search system 114 can be implemented as, for example, computer programs running on one or more computers (e.g., servers) in one or more locations that are coupled to each other through a network. In some implementations, the search system 114 includes an index database 126, a trigger queries database 127 and a search engine 130. In some examples, the search engine 130 includes an indexing engine 120, a ranking engine 122 and an authoritative user (AU) engine 124. The search system 114 responds to the query 110 by generating search results 128, which are transmitted through the network to the client device 104 in a form that can be presented to the user 102 (e.g., as a search results web page to be displayed in a web browser running on the client device 104). In some implementations, the search system 114 can further respond to the query 110 by identifying one or more authoritative users, and can transfer data 129 associated with the one or more authoritative users through the network to the client device 104 in a form that can be presented to the user 102 (e.g., within the search results web page to be displayed in a web browser running on the client device 104).

When the query 110 is received by the search engine 130, the search engine 130 identifies resources that match, or are responsive to the query 110 and can identify one or more authoritative users responsive to the query 110. In the depicted example, the indexing engine 120 indexes resources (e.g., web pages, images, or news articles on the Internet) found in a collection of content and the index database 126 stores the index information. The ranking engine 122 (or other software) is operable to rank resources that match the query 110, such that search results associated with the results can be displayed in a rank order. The indexing and ranking of the resources can be performed using conventional or other techniques. The authoritative user engine 124 can access the trigger queries database 127 to determine whether one or more authoritative users are to be displayed with the search results. The search system 114 can transmit the search results 128 through the network to the client device 104 for presentation to the user 102. If one or more authoritative users are to be displayed with the search results, the search system 114 can transmit the data 129 associated with the one or more authoritative users through the network to the client device 104 for presentation to the user 102.

In accordance with implementations of the present disclosure, a query can be compared to stored trigger queries (e.g., trigger queries stored in the trigger query database 127 of FIG. 1). In some examples, if the query matches or is sufficiently similar to a trigger query, data associated with a set of authoritative users is provided. In some examples, the set of authoritative users can include K authoritative users, where K is a positive integer. In some examples, the data associated with the set of authoritative users can be stored with the trigger query and, for each authoritative user, can include an identifier and a score (S). In some examples, the identifier can include an identifier that uniquely identifies an associated authoritative user within a computer-implemented service (e.g., a social networking service, an electronic messaging service). An example identifier can include an electronic messaging address. In some examples, the score reflects a relative authoritativeness of the associated authoritative user to the particular trigger query.

In some examples, a data set can be stored and can include a tuple associating a trigger query with one or more authoritative users. An example tuple can include $[Q_T, (AU_1, S_1), (AU_2, S_2) \ldots (AU_K, S_K)]$, where $Q_T$ is a trigger query, $AU_K$ is an identifier associated with a particular authoritative user, and $S_K$ is a score associated with the particular authoritative user relative to the trigger query. By way of non-limiting example, a search query can be received from a searching user and can be compared to trigger queries including the trigger query $Q_T$. It can be determined that the search query matches, or is sufficiently similar to, the trigger query QT. Consequently, a set of K authoritative users can be identified and can include $AU_1, \ldots, AU_K$. Data associated with the set of K authoritative users can include $(AU_1, S_1), (AU_2, S_2) \ldots (AU_K, S_K)$ and can be provided for potential display of authoritative users in search results.

In accordance with implementations of the present disclosure, the set of K authoritative users can be processed to define a set of M authoritative users, where M is an integer that is less than K. Consequently, the set of M authoritative users can be considered to be a sub-set of the set of K authoritative users. In some examples, one or more rules can be applied to define the set of M authoritative users from the set of K authoritative users. The AU data (e.g., AU data 129 of FIG. 1) can include data associated with each of the authoritative users in the set of M authoritative users, and can be provided for display to a searching user.

In some examples, a rule can include populating the set of M authoritative users by selecting authoritative users with the highest M scores from the set of K authoritative users. By way of non-limiting example, in response to a match between a search query and a trigger query a set of K authoritative users can be identified and can include $(AU_1, S_1), (AU_2, S_2) \ldots (AU_5, S_5)$ (i.e., K=5). The set of M authoritative users can include the authoritative users having the highest M scores. Continuing with the non-limiting example, it can be provided that $S_1 > S_2 > S_5 > S_4 > S_3$, and M is equal to 3. Consequently, the set of M authoritative users can include $AU_1$, $AU_2$ and $AU_5$.

In some examples, a rule can include partially populating the set of M authoritative users by selecting authoritative users with the highest N scores from the set of K authoritative users, where N is an integer that is less than M, and partially populating the set of M authoritative users by randomly selecting M-N authoritative users from the remaining authoritative users. By way of non-limiting example, in response to a match between a search query and a trigger query a set of K authoritative users can be identified an can include $(AU_1, S_1), (AU_2, S_2) \ldots (AU_5, S_5)$ (i.e., K=5). The set of M authoritative users can be partially populated the authoritative users having the highest N scores. Continuing with the non-limiting example, it can be provided that $S_1 > S_2 > S_5 > S_4 > S_3$, and N is equal to 1. Consequently, the set of M authoritative users can be partially populated with $AU_1$. Of the remaining authoritative users in the set of K authoritative users (i.e., $AU_2$-$AU_5$), M-N authoritative users can be randomly selected and can partially populated the set of M authoritative users. In the non-limiting example, M can be equal to 3. Consequently, 2 authoritative users can be randomly selected and can include, for example, $AU_3$ and $AU_4$. In this example, the set of M authoritative users can include $AU_1$, $AU_3$ and $AU_4$.

In some examples, a rule can include populating the set of M authoritative users by randomly selecting authoritative users from the set of K authoritative users. By way of non-limiting example, in response to a match between a search query and a trigger query a set of K authoritative users can be identified and can include $(AU_1, S_1), (AU_2, S_2) \ldots (AU_5, S_5)$ (i.e., K=5). The set of M authoritative users can include a random selection of M authoritative users. Continuing with the non-limiting example, $AU_2$, $AU_4$ and $AU_5$ can be randomly selected (i.e., M is equal to 3). Consequently, the set of M authoritative users can include $AU_2$, $AU_4$ and $AU_5$.

In some examples, a rule can include considering social connections that might exist between the searching user and any of the set of K authoritative users. Social connections between users can be defined through one or more computer-implemented services. Example computer-implemented services can include a social networking service, a document sharing service, a digital content sharing service (e.g., photo sharing), a blogging service and a micro-blogging service. In some examples, user can be connected with one another as direct contacts and/or indirect contacts in a computer-implemented service. By way of non-limiting example, a social networking service can be considered, where a first user can be a direct contact of a second user, such that the first and second user can share digital content (e.g., social networking posts) via the social networking service. In this example, a third user can be a direct contact of the second user, but is not a direct contact of the first user. Consequently, the third user is an indirect contact of the first user (i.e., is a contact of a contact).

In defining the set of M authoritative users from the set of K authoritative users, it can be determined whether one or more authoritative users in the set of K authoritative users is a contact (e.g., either direct or indirect) of the searching user. If an authoritative user in the set of K authoritative users is a contact of the searching user, the authoritative user is included in the set of M authoritative users. In some examples, if the set of M authoritative users is not complete after social connection consideration (i.e., there are vacancies after including any authoritative users having a social connection to the searching user), the remainder of the set of M authoritative users can be populated based on score and/or random selection.

Figure 2:
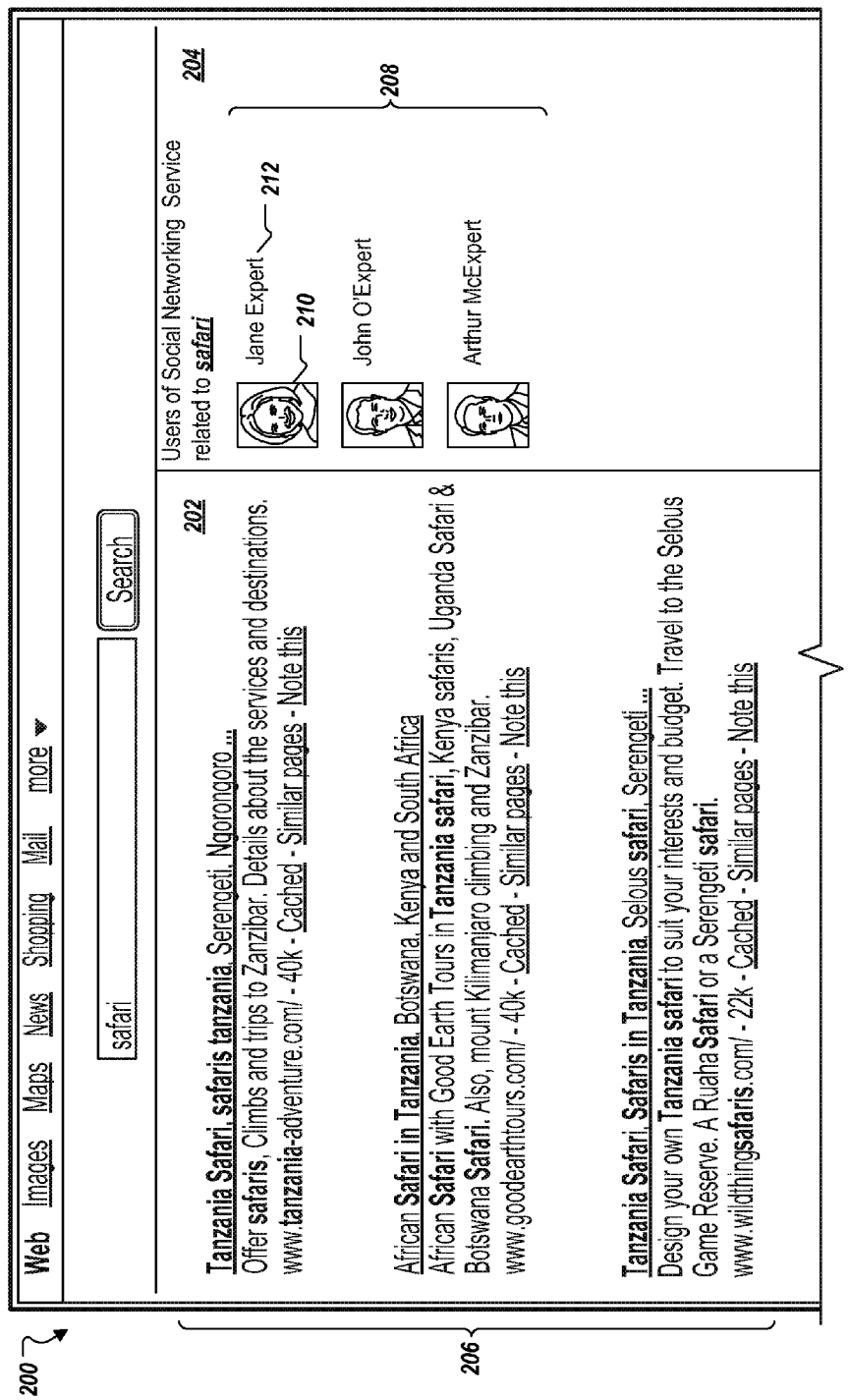
FIG. 2 depicts an example search results page including a search results portion and an authoritative users portion.

FIG. 2 depicts an example search results page 200 including a search results portion 202 and an authoritative users portion 204. The search results page 200 displays example search results in the search results portion 202. The example search results are responsive to the example query "safari." In the depicted example, the displayed search results include web results 206 that are responsive to the example query. It is appreciated, however, that other types of search results (e.g., social search results) can be displayed. In response to the example query, authoritative users 208 are displayed in the authoritative users portion 204. In the depicted example, the authoritative users 208 include "Jane Expert," "John O'Expert" and "Arthur McExpert."

In accordance with implementations of the present disclosure, the example query "safari" of FIG. 2 has been compared to one or more stored trigger queries and has been determined to match, or to be sufficiently similar to a trigger query. Consequently, a set of M authoritative users has been defined and includes the authoritative users 208 displayed in the authoritative users portion 204 (i.e., M=3). As discussed in detail above, the set of M authoritative users can be defined from an initial set of K authoritative users.

In some examples, and as discussed above, one or more rules can have been applied to define the set of M authoritative users. In some examples, a rule can include populating the set of M authoritative users by selecting authoritative users with the highest M scores from the set of K authoritative users. In the example of FIG. 2, the authoritative users "Jane Expert," "John O'Expert" and "Arthur McExpert" can be the authoritative users with the highest M scores from a set of K authoritative users associated with the query "safari." In some examples, a rule can include partially populating the set of M authoritative users by selecting authoritative users with the highest N scores from the set of K authoritative users, and partially populating the set of M authoritative users by randomly selecting M-N authoritative users from the remaining authoritative users. In the example of FIG. 2, the authoritative user "Jane Expert" can be the authoritative user with the highest score in a set of K authoritative users and the authoritative users "John O'Expert" and "Arthur McExpert" can be randomly selected from the set of K authoritative users. In some examples, a rule can include populating the set of M authoritative users by randomly selecting authoritative users from a set of K authoritative users. In the example of FIG. 2, the authoritative users "Jane Expert," "John O'Expert" and "Arthur McExpert" can be randomly selected from the set of K authoritative users.

In some implementations, data associated with each authoritative user 208 can include a thumbnail image 210 and a name 212. In some examples, the thumbnail image 210 and the name 212 are associated with a profile of the particular authoritative user 208 within one or more social networking services. In some examples, each of the thumbnail image 210 and the name 212 can include a link to a profile page associated with the authoritative user 208 in a social networking service of the one or more social networking services. It is appreciated that other data associated with each of the authoritative users can be displayed (e.g., a summary of the authoritative user).

In some implementations, the authoritative users that are displayed can be different for each search performed, even in instances where the same search query is provided. By way of a first non-limiting example, a first searching user can input a search query and, in response to the search query, a first set of authoritative users are displayed. The first searching user can again input the search query and, in response to the search query, a second set of authoritative users is displayed, different from the first set of authoritative users. Consequently, even though the same searching users (i.e., the first searching user) entered the same search query, different sets of authoritative users were displayed. By way of a second non-limiting example, a first searching user can input a search query and, in response to the search query, a first set of authoritative users are displayed, and a second searching user can input the same search query and, in response to the search query, a second set of authoritative users are displayed, different from the first set of authoritative users. Consequently, even though the same search query is input by both the first and second searching uses, different sets of authoritative users were displayed. In some examples, this can be achieved by at least partially populating the set of M authoritative users based on a random selection of authoritative users from the set of K authoritative users.

Figure 3:
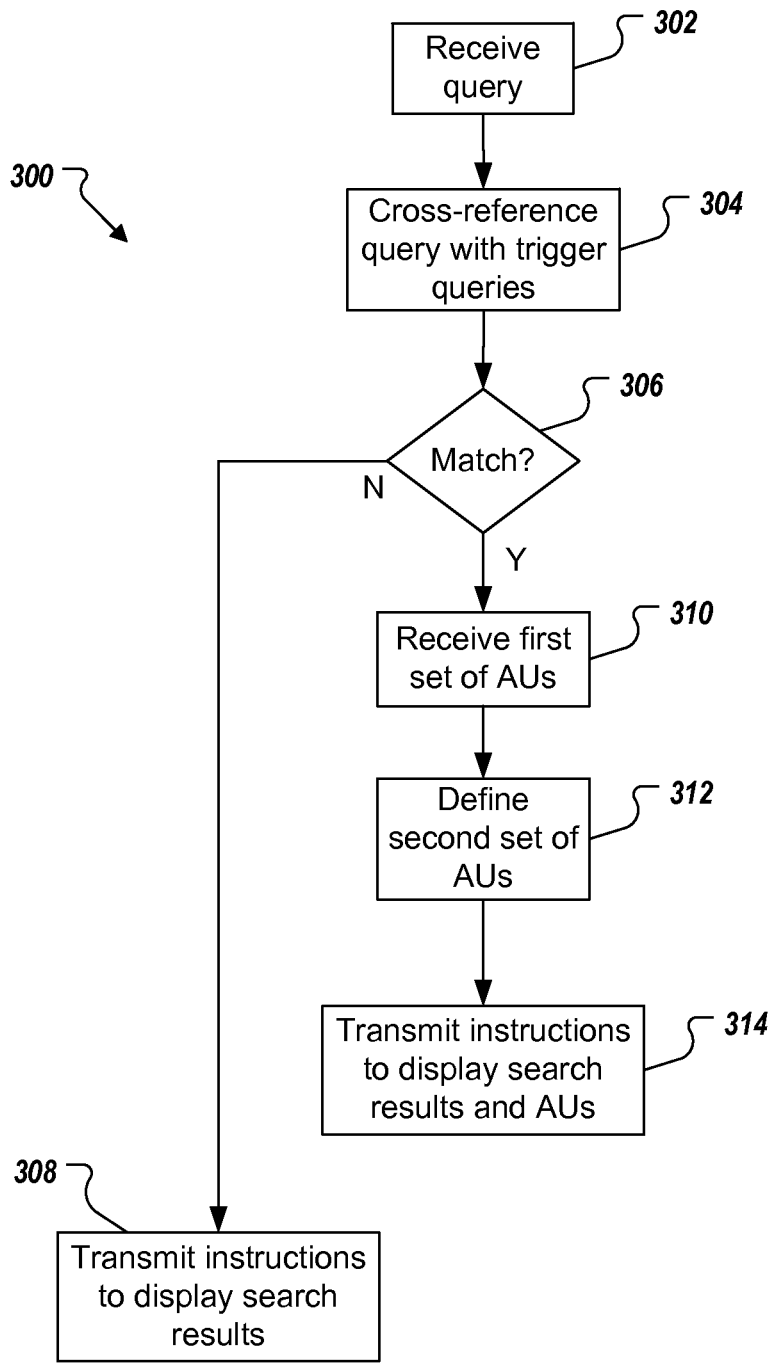
FIG. 3 is a flow diagram of an example process that can be executed in implementations of the present disclosure.

FIG. 3 is a flow diagram of an example process 300 that can be executed in implementations of the present disclosure. In some implementations, the example process 300 can include operations that are performed using one or more computer programs executed using one or more data processing apparatus.

A query is received (302). For example, a searching user inputs a query to a client-computing device (e.g. client device 104 of FIG. 1) and the query is received by a computer-implemented searching service (e.g., the search system 114 of FIG. 1). The query is cross-referenced to stored trigger queries (304). For example, the query can be cross-referenced with queries stored in a trigger query database (e.g., the trigger query database 127 of FIG. 1). It is determined whether the query matches a trigger query (306). If it is determined that the query does not match a trigger query, instructions are transmitted to display search results responsive to the query (308).

If it is determined that the query matches a trigger query, a first set of authoritative users is received (310). For example, a trigger query database can provide a set of K authoritative users in response to the query matching a trigger query. A second set of authoritative users is defined (312). For example, one or more rules can be applied to define a set of M authoritative users from a set of K authoritative users. Instructions are transmitted to display search results and authoritative users responsive to the query (314). The to be displayed authoritative users include the authoritative users provided in the second set of authoritative users.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method executed using one or more processors, the method comprising:
    receiving a first search query and a second search query from a searching user;
    in response to the first and the second search query matching a trigger query, receiving data associated with a set of authoritative users;
    determining a respective score associated with each authoritative user of the set of authoritative users relative to the trigger query;
    identifying a first subset of authoritative users of the set of authoritative users based on the respective score associated with each authoritative user of the set of authoritative users;
    identifying a second subset and a third subset of authoritative users of the set of authoritative users by randomly selecting one or more authoritative users from the set, wherein the one or more randomly selected authoritative users of the second subset and the third subset of authoritative users are exclusive from the authoritative users of the first subset of authoritative users, wherein the one or more randomly selected authoritative users of the second subset of authoritative users differs from the one or more randomly selected authoritative users of the third subset of authoritative users;
    in response to the first search query, transmitting instructions to display data associated with the first and second subset of authoritative users with search results responsive to the first search query; and
    in response to the second search query, transmitting instructions to display data associated with the first and third subset of authoritative users with search results responsive to the second search query.

2. A system, comprising:
    one or more computers; and
    a computer-readable medium coupled to the one or more computers having instructions stored thereon which, when executed by the one or more computers, cause the one or more computers to perform operations comprising:
        receiving a first search query and a second search query from a searching user;
        in response to the first and the second search query matching a trigger query, receiving data associated with a set of authoritative users;
        determining a respective score associated with each authoritative user of the set of authoritative users relative to the trigger query;
        identifying a first subset of authoritative users of the set of authoritative users based on the respective score associated with each authoritative user of the set of authoritative users;
        identifying a second subset and a third subset of authoritative users of the set of authoritative users by randomly selecting one or more authoritative users from the set, wherein the one or more randomly selected authoritative users of the second subset and the third subset of authoritative users are exclusive from the authoritative users of the first subset of authoritative users, wherein the one or more randomly selected authoritative users of the second subset of authoritative users differs from the one or more randomly selected authoritative users of the third subset of authoritative users;
        in response to the first search query, transmitting instructions to display data associated with the first and second subset of authoritative users with search results responsive to the first search query; and
        in response to the second search query, transmitting instructions to display data associated with the first and third subset of authoritative users with search results responsive to the second search query.

3. A computer storage medium encoded with a computer program, the program comprising instructions that when executed by one or more computers cause the one or more computers to perform operations comprising:
    receiving a first search query and a second search query from a searching user;
    in response to the first and the second search query matching a trigger query, receiving data associated with a set of authoritative users;

determining a respective score associated with each authoritative user of the set of authoritative users relative to the trigger query;

identifying a first subset of authoritative users of the set of authoritative users based on the respective score associated with each authoritative user of the set of authoritative users;

identifying a second subset and a third subset of authoritative users of the set of authoritative users by randomly selecting one or more authoritative users from the set, wherein the one or more randomly selected authoritative users of the second subset and the third subset of authoritative users are exclusive from the authoritative users of the first subset of authoritative users, wherein the one or more randomly selected authoritative users of the second subset of authoritative users differs from the one or more randomly selected authoritative users of the third subset of authoritative users;

in response to the first search query, transmitting instructions to display data associated with the first and second subset of authoritative users with search results responsive to the first search query; and in response to the second search query, transmitting instructions to display data associated with the first and third subset of authoritative users with search results responsive to the second search query.

4. The method of claim 1, wherein the trigger query is provided in a plurality of trigger queries electronically stored in a database.

5. The method of claim 1, wherein the trigger query comprises a query for which the set of authoritative users are to be displayed in response to a matching query.

6. The method of claim 1, further comprising processing the data associated with the set of authoritative users by applying one or more rules to the first set of authoritative users.

7. The method of claim 1, wherein each authoritative user includes a user of one or more computer-implemented services that has been determined to be authoritative on one or more topics that can be associated with one or more queries.

8. The method of claim 1, wherein the first search query matches the second search query.

9. The method of claim 1, wherein the first search query is the same as the second search query.

10. The system of claim 2, wherein the trigger query is provided in a plurality of trigger queries electronically stored in a database.

11. The system of claim 2, wherein the trigger query comprises a query for which the first set of authoritative users are to be displayed in response to a matching query.

12. The system of claim 2, further comprising processing the data associated with the set of authoritative users by applying one or more rules to the first set of authoritative users.

13. The system of claim 2, wherein each authoritative user includes a user of one or more computer-implemented services that has been determined to be authoritative on one or more topics that can be associated with one or more queries.

14. The computer storage medium of claim 3, wherein the trigger query is provided in a plurality of trigger queries electronically stored in a database.

15. The computer storage medium of claim 3, wherein the trigger query comprises a query for which the first set of authoritative users are to be displayed in response to a matching query.

16. The computer storage medium of claim 3, further comprising processing the data associated with the set of authoritative users by applying one or more rules to the first set of authoritative users.

17. The computer storage medium of claim 3, wherein each authoritative user includes a user of one or more computer-implemented services that has been determined to be authoritative on one or more topics that can be associated with one or more queries.

18. The method of claim 6, wherein a rule of the one or more rules comprises selecting the first subset of authoritative users associated with respective scores having a higher value than the remaining authoritative users of the first set of authoritative users.

19. The system of claim 12, wherein a rule of the one or more rules comprises selecting the first subset of authoritative users associated with respective scores having a higher value than the remaining authoritative users of the first set of authoritative users.

20. The computer storage medium of claim 16, wherein a rule of the one or more rules comprises selecting the first subset of authoritative users associated with respective scores having a higher value than the remaining authoritative users of the first set of authoritative users.

* * * * *